(12) United States Patent
Kohli

(10) Patent No.: US 10,438,178 B2
(45) Date of Patent: Oct. 8, 2019

(54) SYSTEMS AND METHODS FOR MANAGING ELECTRONIC FUNDS FOR A PROGRAM AND INCENTIVIZING PARTICIPATION IN THE PROGRAM

(71) Applicant: MasterCard International Incorporated, Purchase, NY (US)

(72) Inventor: Manoneet Kohli, O'Fallon, MO (US)

(73) Assignee: Mastercard International Incorporated, Purchase, NY (US)

( * ) Notice: Subject to any disclaimer, the term of this patent is extended or adjusted under 35 U.S.C. 154(b) by 876 days.

(21) Appl. No.: 15/050,627

(22) Filed: Feb. 23, 2016

(65) Prior Publication Data

US 2019/0205845 A1    Jul. 4, 2019

(51) Int. Cl.
| | |
|---|---|
| *G06Q 40/00* | (2012.01) |
| *G07D 11/00* | (2019.01) |
| *G07F 19/00* | (2006.01) |
| *G06K 5/00* | (2006.01) |
| *G06Q 20/10* | (2012.01) |

(52) U.S. Cl.
CPC .................... *G06Q 20/10* (2013.01)

(58) Field of Classification Search
USPC .................................................. 235/379, 380
See application file for complete search history.

(56) References Cited

U.S. PATENT DOCUMENTS

| | | | |
|---|---|---|---|
| 7,305,347 B1 | 12/2007 | Joao | |
| 7,895,058 B2 | 2/2011 | Joao | |
| 8,306,829 B2 | 11/2012 | Starkey et al. | |
| 8,620,803 B1 | 12/2013 | Dennes | |
| 2001/0031456 A1* | 10/2001 | Cynaumon | G09B 7/02 434/350 |
| 2008/0281623 A1* | 11/2008 | Snyder | G06Q 40/02 705/326 |
| 2012/0089510 A1 | 4/2012 | Peyer | |

(Continued)

FOREIGN PATENT DOCUMENTS

| | | |
|---|---|---|
| WO | 03/040877 | 5/2003 |
| WO | 2013/039932 | 3/2013 |

OTHER PUBLICATIONS

Schechner-Resom, M., "International Search Report", International Application No. PCT/US2017/015060, dated May 23, 2017, 5 pages.

(Continued)

*Primary Examiner* — Tuyen K Vo

(57) ABSTRACT

Embodiments of the disclosure enable electronic funds to be managed for a program that includes a plurality of parties including a participant and a sponsor. One or more metrics corresponding to a participation of the participant in the program are received. If the received metrics satisfy one or more predetermined thresholds, a quantity of the electronic funds is determined for distribution to the plurality of parties. A first instruction to transfer a first portion of the determined quantity of the electronic funds to a first financial account associated with the participant is generated, and a second instruction to transfer a second portion of the determined quantity of the electronic funds to a second financial account associated with the sponsor is generated. Aspects of the disclosure provide for a computing system for managing electronic funds for a program.

20 Claims, 9 Drawing Sheets

(56) References Cited

U.S. PATENT DOCUMENTS

| | | | |
|---|---|---|---|
| 2012/0231438 A1* | 9/2012 | Fakhrai | G09B 7/00 |
| | | | 434/350 |
| 2013/0018813 A1* | 1/2013 | Carroll | G06Q 50/20 |
| | | | 705/327 |
| 2013/0166467 A1 | 6/2013 | Carroll et al. | |
| 2013/0196306 A1* | 8/2013 | Tetreau | G09B 7/00 |
| | | | 434/350 |
| 2016/0092906 A1* | 3/2016 | Cioffi | G06Q 30/0236 |
| | | | 705/14.36 |

OTHER PUBLICATIONS

Schechner-Resom, M., "Written Opinion", International Application No. PCT/US2017/015060, dated May 23, 2017, 6 pages.

* cited by examiner

SYSTEMS AND METHODS FOR MANAGING ELECTRONIC FUNDS FOR A PROGRAM AND INCENTIVIZING PARTICIPATION IN THE PROGRAM

FIELD OF THE DISCLOSURE

The subject matter described herein relates generally to information processing and, more specifically, to managing distribution and use of funds for a program.

BACKGROUND

Some entities, including private entities and/or government agencies, support and provide assistance to people through the implementation of various programs (e.g., educational programs). Various support mechanisms are used for these programs by providing, for example, access to education materials, meal services, and/or financial assistance. However, known systems providing such assistance do not allow effective monitoring and implementation of the programs.

SUMMARY

Embodiments of the disclosure enable a computer-implemented method for managing electronic funds for a program that includes a plurality of parties including a participant and a sponsor. The computer-implemented method includes receiving, from one or more computing devices, one or more metrics corresponding to a participation of the participant in the program. The one or more computing devices are associated with one or more of the plurality of parties. On condition that the received one or more metrics satisfy one or more predetermined thresholds, a quantity of the electronic funds is determined for distribution to the plurality of parties. A first instruction to transfer a first portion of the determined quantity of the electronic funds to a first financial account associated with the participant is generated, and a second instruction to transfer a second portion of the determined quantity of the electronic funds to a second financial account associated with the sponsor is generated.

In another aspect, a computing device for managing electronic funds for a program is provided. The computing device includes a memory device that stores data associated with a plurality of parties in the program and computer-executable instructions, and a processor configured to execute the computer-executable instructions to receive one or more metrics corresponding to a participation of a first party of the plurality of parties in the program, compare the received one or more metrics with one or more predetermined thresholds to determine whether the received one or more metrics satisfy the one or more predetermined thresholds, on condition that the received one or more metrics satisfy the one or more predetermined thresholds, determine a first portion of the electronic funds for distribution to the first party and a second portion of the electronic funds for distribution to a second party of the plurality of parties, transmit a first instruction to transfer the first portion of the electronic funds to a first financial account associated with the first party, and transmit a second instruction to transfer the second portion of the electronic funds to a second financial account associated with the second party.

In yet another aspect, a computer-readable storage device is provided with computer-executable instructions embodied thereon. Upon execution by at least one processor, the computer-executable instructions cause the processor to receive, from a participant client device and/or a sponsor client device, a participant metric and/or a sponsor metric, determine whether the received participation metrics and/or sponsor metric satisfy one or more predetermined thresholds associated with the program, on condition that the received participant metric and/or sponsor metric satisfy the one or more predetermined thresholds, determine a first portion of electronic funds for distribution to a participant in a program and a second portion of the electronic funds for distribution to a sponsor of the program, generate a first instruction to transfer the first portion of the electronic funds to a first financial account associated with the participant, and generate a second instruction to transfer the second portion of the electronic funds to a second financial account associated with the sponsor.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

Corresponding reference characters indicate corresponding parts throughout the drawings.

DETAILED DESCRIPTION

Figure 1:
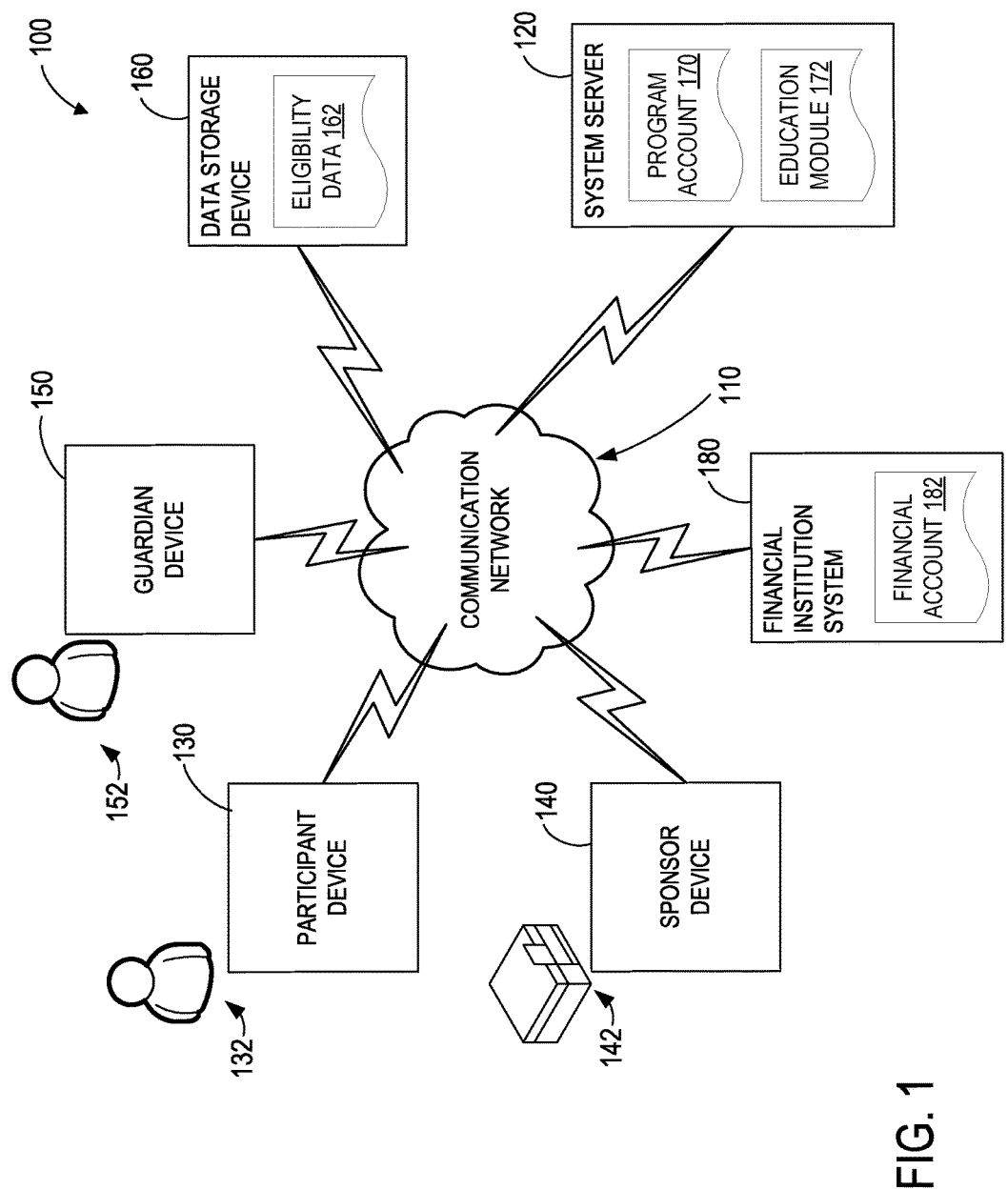
FIG. 1 is a block diagram illustrating an example environment for managing distribution and use of funds for a program.

The subject matter described herein relates to the management, distribution, and use of electronic funds associated with a program. Embodiments of the disclosure provide the ability to reward and/or incentivize a participant and/or a sponsor of a program (e.g., an educational program). The embodiments of the disclosure may receive a request to enroll a participant in the program, and verify the eligibility of the participant to participate in the program. Biometric data of the participant may be used to enroll the participant and to secure the participant's computing device for use in the program. Embodiments described herein enable a computer system to monitor the participant's progress toward thresholds established for the program, and, based on achieving the thresholds, distribute and control the use of electronic funds among the parties.

Aspects of the disclosure provide for a computing system for managing electronic funds for a program. For example, the computing system stores data associated with a plurality of parties participating in the program, including a participant, a guardian, and/or a sponsor. The computing system may receive a request to enroll a participant in the program. Upon receiving the request, the computing system may transmit, to a participant computing device, a prompt for the participant to provide data for enrollment. The computing device may receive, from the participant client device, the requested data for enrollment, and upon receiving the requested data, communicate with a data storage device to determine an eligibility of the participant. If the participant is eligible to participate in the program, the computing system may enroll the participant in the program. The computing device may receive metrics corresponding to a participation of the participant in the program, and, if the received metrics satisfy predetermined thresholds, determine a quantity of the electronic funds for distribution to the plurality of parties. The computing device may generate an instruction to transfer a first portion of the determined quantity of the electronic funds to a first financial account associated with the participant, and to transfer a second portion of the determined quantity of the electronic funds to a second financial account associated with the sponsor.

The systems and processes described herein may be implemented using computer programming or engineering techniques including computer software, firmware, hardware or a combination or subset thereof. At least one technical problem with known disbursement systems for and programs providing assistance for program participants is that known disbursement systems do not effectively monitor or implement disbursements. The embodiments described herein address that technical problem. For example, by enrolling a participant in the program through the use of biometric credentials and linking a guardian's enrollment to the participant's enrollment, some embodiments provide or improve a mechanism for monitoring an enrollment of the parties associated with the program, a progress of the participant associated with the program, and disbursement of electronic funds to the parties associated with the program. In this manner, the embodiments described herein may facilitate rewarding and incentivizing the participant to progress through the program by disbursing electronic funds to the various parties as metrics are determined to satisfy predetermined thresholds. Additionally, some embodiments may improve computing device security and/or data transmission security by linking the use and transfer of data via the use of unique biometric data associated with at least one of the parties associated with the program. In some embodiments, the subject matter described herein may facilitate controlling the use of the disbursed electronic funds to encourage participation in the program.

The technical effect of the systems and processes described herein is achieved by performing at least one of the following operations: a) receiving a request to enroll a participant in a program; b) receiving a request to enroll or linking a guardian in the program; c) transmitting a prompt to provide data for financial account registration; d) receiving user input for financial account registration; e) communicating with a data storage device to associate the financial account with the participant; f) receiving metrics corresponding to a participation of the participant in the program; g) determining whether the received metrics satisfy one or more predetermined thresholds associated with the program; h) determining a first portion of electronic funds for distribution to the participant and a second portion of the electronic funds for distribution to a sponsor of the program; i) transmitting an instruction to transfer the first portion of the electronic funds to a first financial account associated with the participant; and j) transmitting an instruction to transfer the second portion of the electronic funds to a second financial account associated with the sponsor.

FIG. 1 is a block diagram illustrating an example environment 100 for managing distribution and use of electronic funds for a program. The environment 100 includes a communication network 110 that enables data to be transmitted and/or received between a plurality of devices coupled to the network 110. Example communication networks 110 include a cellular or mobile network, and the Internet. Alternatively, the communication network 110 may be any communication medium that enables the environment 100 to function as described herein, for example, a personal area network, a local area network, or a wide area network.

A server device or system server 120 is communicatively coupled to, a participant device 130 associated with a participant 132 (e.g., a first party, a student), and a sponsor device 140 associated with a sponsor 142 (e.g., a second party, an educational institution, a school, etc.) via the network 110. The system server 120 may be associated with or administered by a public organization (e.g., a department of education, a school district, etc.) or a private organization that manages, administers, or supports the program. In some embodiments, the system server 120 is managed or supported by another entity in the environment 100 (e.g., sponsor 142). As used herein, the terms "server device" and "system server" may be used interchangeably, and may be understood to mean a single computing device or a plurality of interconnected computing devices that operate together to perform a particular function. That is, the system server 120 may be contained within a single hardware unit or be distributed among several or many different hardware units, including in the "cloud."

In some embodiments, the system server 120 is communicatively coupled to a guardian device 150 associated with a guardian 152 (e.g., a parent or guardian of the participant 132) via the network 110. The environment 100 may include the guardian device 150 and/or the guardian 152, for example, when the participant 132 is a minor (e.g., a person under a predetermined age) or when the guardian 152 is responsible to care for one or more interests of the participant 132.

The participant device 130, the sponsor device 140, and/or the guardian device 150 may each be a single computing device or a plurality of interconnected computing devices that operate together to perform a particular function. For example, the participant device 130, the sponsor device 140, and/or the guardian device 150 may be a desktop computer, a laptop computer, a mobile device, a tablet, and/or any other computing device that is configured to communicate with or access the system server 120 via the network 110.

In some embodiments, the system server 120 retrieves and/or receives, from one or more computing devices (e.g., participant device 130, sponsor device 140, guardian device 150) enrollment data for managing program enrollment, one or more participation metrics for managing program participation, and/or financial account data for managing electronic funds for the program. For example, the system server 120 may enroll one or more participants 132 into a program and disburse electronic funds to the participant 132, sponsor 142, and/or guardian 152 based on a participation of the participant 132 in the program.

The electronic funds may be public funds or private funds. In one embodiment, the program is a public program and may be funded with public funds. For example, the program may be a public educational assistance program for promoting education. Public funds may refer to money that is generated by a government or government agency for providing goods and/or services to the public. In another embodiment, the program is a private program and may be funded with private funds. For example, the program may be a scholarship program for promoting education. Private funds may refer to money provided by a person, a group of persons, or other private entity including, without limitation, the participant 132, the sponsor 142, and/or the guardian 152 for providing goods and/or services to one or more beneficiaries.

In some embodiments, the system server 120 receives a request to enroll the participant 132 into the program (e.g., request for enrollment). The request for enrollment may be received from, for example, the participant device 130, the sponsor device 140, and/or the guardian device 150. The request for enrollment may include, for example, personal data associated with the participant 132 (e.g., name, address, telephone number, email address, biometric data, student identifier) and/or link data associated with other entities that may be associated with the participant 132 (e.g., sponsor 142, guardian 152, etc.).

In some embodiments, the system server 120 is configured to communicate with a data store or storage device 160 to facilitate determining or confirming whether the participant 132 is eligible to enroll into the program. For example, the data storage device 160 may include data associated with one or more eligible participants (e.g., eligibility data 162). In one embodiment, the system server 120 may receive or retrieve eligibility data 162 from the data storage device 160, and compare the personal data associated with the participant 132 with the eligibility data 162 to determine whether the participant 132 is eligible to enroll into the program. Alternatively, the request for enrollment may be forwarded or transmitted to the data storage device 160, at which the personal data is compared with the eligibility data 162, and from which a determination or confirmation of an eligibility of the participant 132 is received.

In some embodiments, the data storage device 160 is associated with or managed by another entity in the environment 100 (e.g., sponsor 142). Alternatively, the data storage device 160 may be associated with or managed by a third-party organization (e.g., a department of education, a school district, etc.) that stores or has access to at least some eligibility data 162. Eligibility data 162 may include, for example, one or more user identifiers (e.g., student numbers, government-issued numbers, etc.) and/or biometric data (e.g., photographs, fingerprints, iris scans, etc.) associated with one or more participants 132 eligible to participate in the program.

If the participant 132 is eligible to participate in the program, the system server 120 enrolls the participant 132 into the program. For example, the system server 120 may generate a program account 170 based on a request for enrollment, and associate the program account 170 with a participant device 130 associated with a participant 132 based on the personal data. Additionally or alternatively, the system server 120 may link or associate the program account 170 with a sponsor device 140 and/or a guardian device 150 based on the link data.

The participant device 130 is configured to communicate with the system server 120 to receive, store, and/or transmit data (e.g., participation metrics, biometric data, financial account data, etc.). In some embodiments, the participant device 130 receives, from a participant 132, user input, and generates one or more participation metrics (e.g., participant metrics) indicative of a participation of the participant 132 in the program based on the user input (e.g., attendance records, homework progress, assignment progress, quiz scores, test scores, class rank, etc.).

In some embodiments, the participant device 130 communicates with the system server 120 to present one or more education modules 172 associated with homework, assignments, quizzes, tests, and the like. The education modules 172 may be used to prompt or encourage the participant 132 to interact with the participant device 130 (e.g., to provide user input) and participate in the program. At least some participation metrics (e.g., participant metrics) may be generated based on the interaction with the participant device 130.

The sponsor device 140 is configured to communicate with the system server 120 and/or the participant device 130 to receive, store, and/or transmit data (e.g., participation metrics, biometric data, financial account data, etc.). In some embodiments, the sponsor device 140 receives, from the participant device 130, data corresponding to user input provided at the participant device 130, and generates one or more participation metrics (e.g., sponsor metrics) indicative of a participation of the participant 132 in the program based on the received data. Additionally or alternatively, at least some participation metrics (e.g., sponsor metrics) are generated based on user input provided at the sponsor device 140 (e.g., from the sponsor 142).

In some embodiments, the sponsor device 140 may be used to generate one or more education modules 172, and/or transmit the generated education modules 172 to the system server 120. Additionally or alternatively, the sponsor device 140 may transmit one or more education modules 172 to the participant device 130 for presentation to the participant 132.

The guardian device 150 is configured to communicate with the system server 120, the participant device 130, and/or the sponsor device 140 to receive, store, and/or transmit data (e.g., participation metrics, biometric data, financial account data, etc.). In some embodiments, the guardian device 150 receives, from the system server 120, the participant device 130, and/or the sponsor device 140, one or more participation metrics indicative of a participation of the participant 132 in the program. In this manner, the guardian 152 may use the guardian device 150 to monitor a participation of the participant 132 in the program. In some embodiments, at least some participation metrics (e.g., guardian metrics) are generated based on user input provided at the guardian device 150 (e.g., from the guardian 152).

In some embodiments, the environment 100 includes one or more financial institution systems 180 configured to communicate with the system server 120, the participant device 130, the sponsor device 140, and/or the guardian device 150 to receive, store, and/or transmit data (e.g., financial account data, etc.). In some embodiments, the financial institution system 180 receives, from the system server 120, the participant device 130, the sponsor device 140, and/or the guardian device 150, financial account data for associating one or more financial accounts 182 with the program. For example, the financial institution system 180 may transfer electronic funds between financial accounts 182 based on one or more participation metrics indicative of a participation of the participant 132 in the program.

To ensure, or at least increase a confidence, that a user operating a computing device (e.g., participant device 130, sponsor device 140, guardian device 150) is an authorized user (e.g., participant 132, sponsor 142, guardian 152, respectively), the computing device may, for example, authenticate the user by receiving, from the user, one or more credentials (e.g., username, password, biometric data) and comparing the received credentials with one or more registered credentials. For example, the participant device 130 may include one or more biometric sensors (not shown) configured to detect or measure one or more biometric features of the participant 132 (e.g., fingerprint, iris, facial feature, voice, etc.), and use the biometric features to enable single sign on access to use the participant device 130 and/or a program account 170 or an education module 172 at the participant device 130.

In some embodiments, the registered credentials are stored locally at the computing device (e.g., participant device 130, sponsor device 140, guardian device 150). Additionally or alternatively, the computing device may communicate with another computing device (e.g., system server 120, data storage device 160) to receive or retrieve the registered credentials. Upon authenticating the user, the computing device may present a usable mode or configuration (e.g., an "unlocked" configuration) and, in some embodiments, log or track an interaction with the computing device for generating one or more participation metrics.

Figure 2:
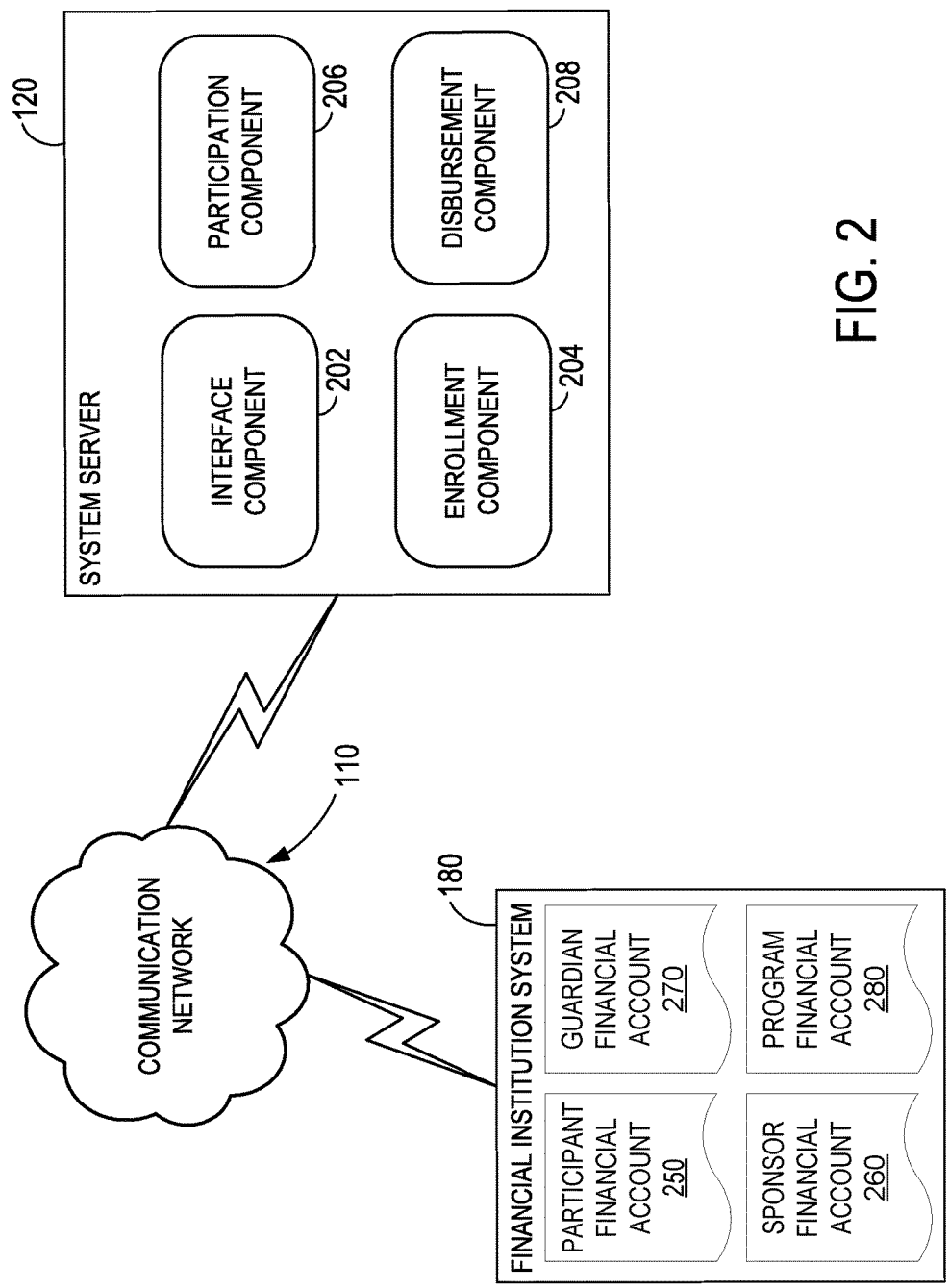
FIG. 2 is a block diagram illustrating example modules that may be used to manage distribution and use of funds for a program.

FIG. 2 is a block diagram illustrating example modules that may be used to manage distribution and use of electronic funds for the program in the environment 100 (shown in FIG. 1). The modules may be stored, for example, at the system server 120. For example, the system server 120 may include an interface component 210, an enrollment component 220, a participation component 230, and/or a disbursement component 240.

The interface component 210 enables the system server 120 to receive data from and/or transmit data to one or more other devices (e.g., participant device 130, sponsor device 140, guardian device 150, data storage device 160, financial institution system 180) via the network 110. In some embodiments, the interface component 210 is configured to communicate with another device for presenting information to the participant 132, the sponsor 142, and/or the guardian 152, and/or for prompting the participant 132, the sponsor 142, and/or the guardian 152 to provide user input. The interface component 210 is coupled to and configured to communicate with the enrollment component 220, the participation component 230, and/or the disbursement component 240 to facilitate communication between another device and the enrollment component 220, the participation component 230, and/or the disbursement component 240.

The enrollment component 220 is configured to communicate (e.g., via the interface component 210) with the participant device 130 and/or the data storage device 160 to manage program enrollment of the participant 132 into the program, and with the sponsor device 140, the guardian device 150, and/or the data storage device 160 to manage linking the sponsor 142 and/or the guardian 152 to the participant 132. For example, the enrollment component 220 may receive a request to enroll the participant 132 into the program. In some embodiments, the request to enroll is generated at the participant device 130, the sponsor device 140, and/or the guardian device 150, and transmitted to the enrollment component 220.

In some embodiments, the enrollment component 220 enrolls the participant 132 into the program based on personal data. Additionally or alternatively, the enrollment component 220 may link or associate one or more entities (e.g., sponsor 142, guardian 152) to the participant 132 based on the link data. Before enrolling the participant 132 into the program, in some embodiments, the enrollment component 220 determines or confirms whether the participant 132 is eligible to enroll into the program. For example, the enrollment component 220 may communicate with the data storage device 160 such that personal data associated with the participant 132 may be compared with eligibility data 162 to facilitate determining or confirming whether the participant 132 is eligible to enroll into the program.

In some embodiments, personal data is registered or associated with a participant device 130 such that the participant device 130 is configured to selectively allow a user (e.g., participant 132) to access at least some data associated with a program account 170 or restrict a user (e.g., a user other than the participant 132) from accessing at least some data associated with the program account 170. Upon enrolling the participant 132 into the program, in some embodiments, the enrollment component 220 transmits an enrollment confirmation to the participant device 130, the sponsor device 140, and/or the guardian device 150.

The participation component 230 is configured to communicate (e.g., via the interface component 210) with the participant device 130, the sponsor device 140, the guardian device 150, and/or the data storage device 160 to manage or monitor a participation in the program. For example, the participation component 230 may receive or retrieve one or more participation metrics indicative of a participation in the program (e.g., attendance records, homework progress, assignment progress, quiz scores, test scores, class rank, etc.).

In some embodiments, the participation component 230 may use one or more education modules 172 to generate one or more participation metrics to indicate a participation in the program. For example, the participation component 230 may transmit the education module 172 to the participant device 130, the sponsor device 140, and/or the guardian device 150, where the education module 172 is configured to receive user input associated with a participation in the program.

The user input may be associated with a quantity of participation in the program and/or a quality of participation in the program. For example, the quantity of participation in the program may include a quantity of time (e.g., a number of hours) spent or logged on the participant device 130 or on the education module 172 and/or a quantity of completed homework, assignments, quizzes, or tests. The quantity of time may be tracked or recorded, for example, using a timer application associated with the participant device 130 and/or the education module 172. The quality of participation in the program may include a grade or score associated with a homework, assignment, quiz, or test and/or a class rank. The homework, assignment, quiz, or test may be administered by the sponsor 142, for example, and the grade or score may be generated or calculated at the education module 172 based on an interaction with the education module 172 or be provided as input (e.g., as user input) at the education module 172. The class rank may be determined based on the grades or scores by comparing one or more grades or scores associated with the participant 132 with one or more grades or scores associated with other students (e.g., other participants enrolled into the program).

In some embodiments, the participant device 130 uses the education module 172 to allow the participant 132 to check in, provide status updates, complete homework or assignments, take quizzes or tests, and the like. Additionally or alternatively, the sponsor device 140 and/or the guardian device 150 may use the education module 172 to allow the sponsor 142 and/or the guardian 152, respectively, to provide and/or monitor attendance records, homework progress, assignment progress, quiz scores, test scores, class rank, and the like. While some of the embodiments described herein describe two categories of participation metrics (e.g., quantity or participation, quality of participation), it is contemplated that a participation metric may be categorized in any number of categories.

In some embodiments, the participation component 230 receives data associated with the user input and, based on the received data, generates one or more participation metrics. Additionally or alternatively, the education module 172 may generate one or more participation metrics at the participant device 130 (e.g., participant metrics), at the sponsor device 140 (e.g., sponsor metrics), and/or at the guardian device 150 (e.g., guardian metrics), and transmit the generated participation metrics to the participation component 230. In some embodiments, the participation component 230 utilizes at least some personal data to determine or confirm whether a user (e.g., a participant 132) is associated with a device (e.g., a participant device 130) such that the user may be authenticated. For example, the participation component 230 may receive at least some personal data and compare the received personal data with personal data registered with a program account 170 to selectively allow access to at least some data associated with the program account 170 or restrict access from at least some data associated with the program account 170.

The disbursement component 240 is configured to communicate (e.g., via the interface component 210) with the participant device 130, the sponsor device 140, and/or the guardian device 150 to manage or monitor electronic funds associated with the program. In some embodiments, the disbursement component 240 may receive or retrieve one or more participation metrics and compare the participation metrics with one or more predetermined thresholds to determine a progress of the participation in the program. That is, the disbursement component 240 may monitor the progress of the participant in the program based upon whether one or more participation metrics satisfy the one or more predetermined thresholds.

In some embodiments, the disbursement component 240 determines a quantity of electronic funds based on the progress of the participation in the program, and disburses or allocates the quantity of electronic funds to one or more financial accounts 182. For example, a first portion of the determined quantity of electronic funds may be disbursed or allocated to a participant financial account 250 associated with the participant 132, a second portion of the determined quantity of electronic funds may be disbursed or allocated to a sponsor financial account 260 associated with the sponsor 142, and, in some embodiments, a third portion of the determined quantity of electronic funds may be disbursed or allocated to a guardian financial account 270 associated with the guardian 152.

In some embodiments, the disbursement component 240 may receive, from the participant device 130, the sponsor device 140, and/or the guardian device 150, a request to register a financial account 182 (e.g., a participant financial account 250, a sponsor financial account 260, and/or a guardian financial account 270, respectively) with the program. The request to register may include, for example, personal data (e.g., name, address, telephone number, email address, etc.) and/or financial account data associated with the financial account 182. Based on the personal data and/or the financial account data, the disbursement component 240 communicates (e.g., via the interface component 210) with one or more financial institution systems 180 to couple the program account 170 to one or more financial accounts 182 (e.g., participant financial account 250, sponsor financial account 260, guardian financial account 270) such that the electronic funds may be transferred between a program financial account 280 and the financial accounts 182. For example, the disbursement component 240 may communicate with one or more financial institution systems 180 to transfer the first portion of a quantity of electronic funds to the participant financial account 250, the second portion of the quantity of electronic funds to the sponsor financial account 260, and, in some embodiments, the third portion of the quantity of electronic funds to the guardian financial account 270. Upon registering the financial accounts 250, 260, and/or 270 with the program, in some embodiments, the disbursement component 240 transmits a registration confirmation to the participant device 130, the sponsor device 140, and/or the guardian device 150, respectively.

In some embodiments, the disbursement component 240 transmits an instruction to transfer electronic funds with one or more parameters that control access to or disbursement of at least some of the transferred electronic funds. For example, the transferred electronic funds may be associated with one or more permissions and/or restrictions that control a spending of the electronic funds to be for goods or services associated with one or more predetermined categories (e.g., education, books, supplies, housing, food) or with one or more predetermined merchants. In some embodiments, the electronic funds may be managed or controlled using a digital wallet system (e.g., a MASTERPASS® brand digital wallet). (MASTERPASS® is a registered trademark of MasterCard International Incorporated located in Purchase, N.Y.). Alternatively, the electronic funds may be managed or controlled using any mechanism that enables the environment 100 to function as described herein.

Figure 3:
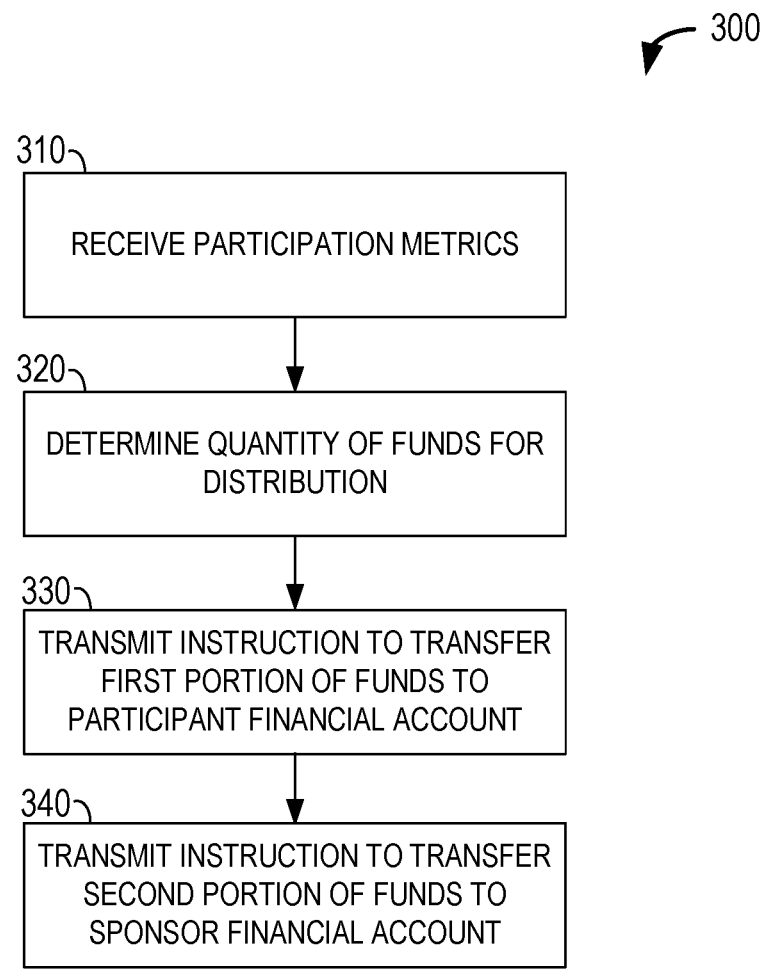
FIG. 3 is a flowchart of an example method for managing distribution and use of funds for a program.

FIG. 3 is a flowchart of an example method 300 for managing distribution and use of electronic funds for the program in the environment 100 (shown in FIG. 1). The method 300 may be performed or implemented using, for example, the system server 120 (shown in FIGS. 1 and 2) to facilitate rewarding or incentivizing a participant 132, a sponsor 142, and/or a guardian 152 to participate in the program. In one embodiment, the program may be an educational program for encouraging the participant 132 to pursue an education. The program account 170 may be funded with public funds and/or private funds. One or more participation metrics indicative of a participation in the program are received at 310. The metrics may be transmitted to the system server 120, for example, by the participant device 130, the sponsor device 140, and/or the guardian device 150.

Based on the received participation metrics, a quantity of electronic funds is determined at 320 for distribution to the participant 132 and/or the sponsor 142. Upon determining the quantity of electronic funds, a first portion of the electronic funds is determined for transfer to the participant 132, and/or a second portion of the electronic funds is determined for transfer to the sponsor 142. Based on the determinations, a first instruction to transfer the first portion to the participant financial account 250 is transmitted at 330, and a second instruction to transfer the second portion to the sponsor financial account 260 is transmitted at 340.

Figure 4:
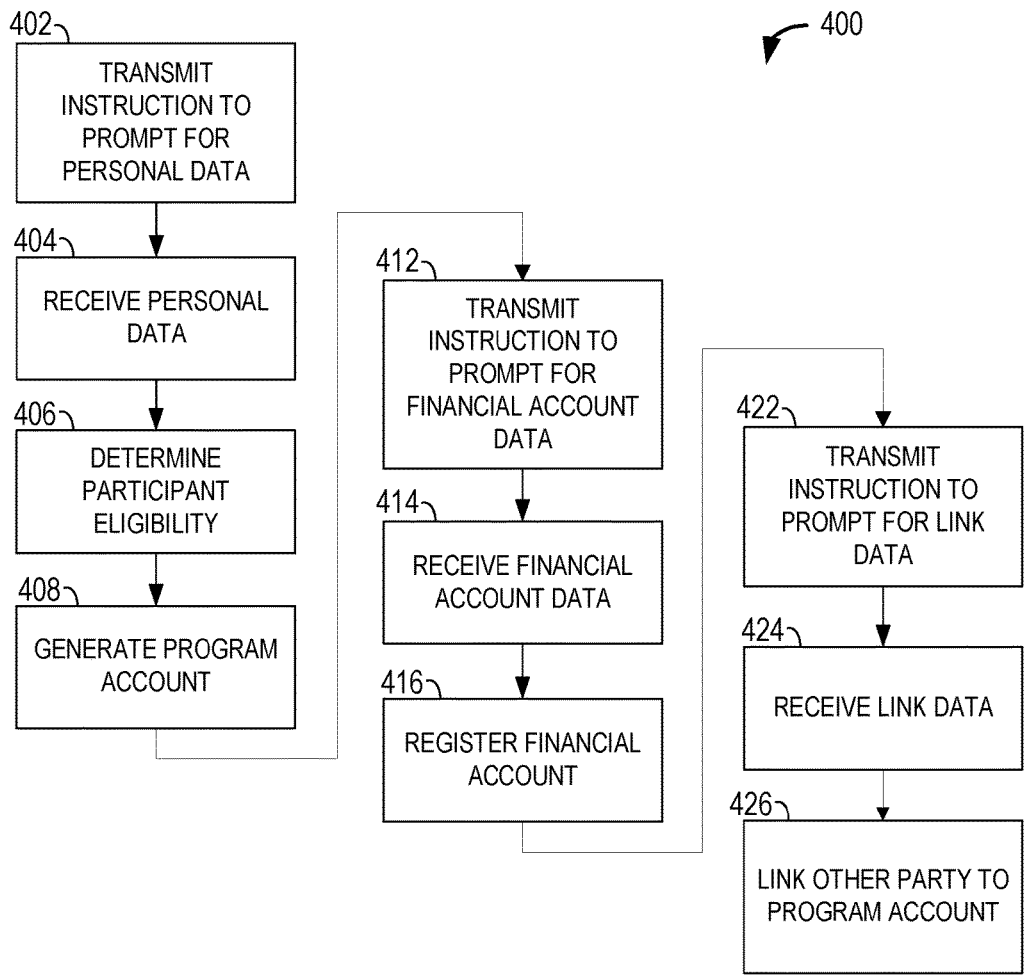
FIG. 4 is an example flowchart of an example method for managing enrollment into a program.

FIG. 4 is a flowchart of example method 400 for managing enrollment into a program in the environment 100 (shown in FIG. 1). A request for enrollment including personal data associated with a participant 132 and link data associated with one or more other entities (e.g., sponsor 142, guardian 152) associated with the participant 132 may be received. In some embodiments, the request for enrollment includes a request to register a financial account 182 with the program.

In some embodiments, an instruction to prompt a user (e.g., participant 132, sponsor 142, guardian 152) for personal data associated with the participant 132 may be transmitted at 402. The instruction may be transmitted, for example, to the participant device 130, the sponsor device 140, and/or the guardian device 150. Personal data may include, for example, a unique identifier that is associated with the participant's biometric and/or demographic data. Upon receiving at 404 personal data, it is determined at 406 that the participant 132 is eligible to enroll into the program. For example, the personal data may be compared with eligibility data 162 to determine whether the participant 132 is eligible.

In one embodiment, the eligibility data 162 is stored at a data storage device 160. The data storage device 160 may be a third-party system configured to collect and/or store biometric data associated with a plurality of users. For example, the data storage device 160 may be associated with a government agency that collects biometric and demographic data of the users, stores the biometric and demographic data in the data storage device 160, issues a unique identifier to each user, and/or stores the unique identifier in the data storage device 160 such that a unique identifier for a user is associated with biometric and demographic information for the user. Based on the personal data, a program account 170 is generated at 408 to enroll the participant 132 into the program.

In some embodiments, an instruction to prompt a user (e.g., participant 132, sponsor 142, guardian 152) for financial account data associated with the user may be transmitted at 412. The instruction may be transmitted, for example, to the participant device 130, the sponsor device 140, and/or the guardian device 150. Upon receiving at 414 financial account data, a financial account 182 corresponding to the financial account data is coupled to or registered at 416 with the program account 170 such that electronic funds may be transferred to the financial account 182.

In some embodiments, an instruction to prompt a user (e.g., participant 132, sponsor 142, guardian 152) for link data associated with one or more other entities (e.g., sponsor 142, guardian 152) may be transmitted at 422. The instruction may be transmitted, for example, to the participant device 130, the sponsor device 140, and/or the guardian device 150. Link data may include, for example, a unique identifier associated with the sponsor 142 or the guardian 152, such as an electronic mail (e-mail) address, an Internet Protocol (IP) address, a Media Access Control (MAC) address, a Mobile Equipment Identifier (MEID), a universal unique identifier (UUID), a unique device identifier (UDID), and the like. Upon receiving at 424 link data, a computing device associated with the other party (e.g., a sponsor device 140, a guardian device 150) is coupled or linked at 426 to the program account 170 such that a user of the computing device may have access to the program account 170. In some embodiments, an instruction to prompt a user (e.g., sponsor 142, guardian 152) of the computing device for personal data associated with the user may be transmitted to confirm or verify an identity of the user.

Figure 5:
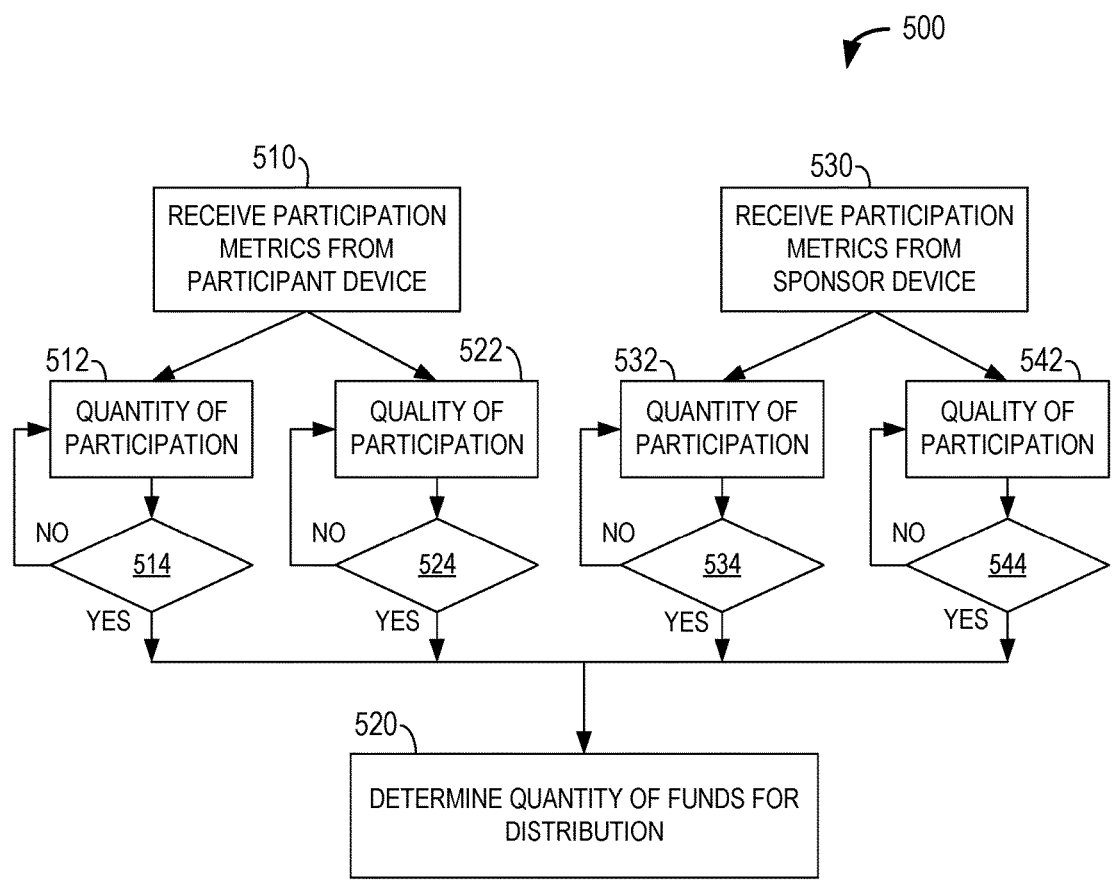
FIG. 5 is a flowchart of an example method for determining a quantity of funds for distribution.

FIG. 5 is a flowchart of an example method 500 for determining a quantity of electronic funds for distribution in the environment 100 (shown in FIG. 1). One or more participation metrics may be used to monitor progress in the program. For example, data may be captured or provided at the participant device 130, the sponsor device 140, and/or the guardian device 150, and the data may be used to generate the one or more participation metrics.

In some embodiments, one or more participation metrics indicative of a participation in the program are received at 510 from the participant device 130. The participation metrics may be associated with a quantity of participation and/or a quality of participation. A first participation metric associated with a quantity of participation is identified at 512, and it is determined at 514 whether the first participation metric satisfies a first predetermined threshold. For example, the first participation metric may include or be associated with a quantity of time (e.g., a number of hours) spent or logged on the participant device 130 or on the education module 172. For another example, the first participation metric may include or be associated with a quantity of completed homework, assignments, quizzes, or tests. The first participation metric may be compared with the first predetermined threshold to determine whether the first predetermined threshold is satisfied. If the first predetermined threshold is satisfied, the first participation metric is used to determine at 520 a quantity of electronic funds for distribution. On the other hand, if the first predetermined threshold is not satisfied, the first participation metric is not used to determine at 520 the quantity of electronic funds for distribution. The operations may be iteratively performed for each participation metric associated with a quantity of participation.

A second participation metric associated with a quality of participation is identified at 522, and it is determined at 524 whether the second participation metric satisfies a second predetermined threshold. For example, the second participation metric may include or be associated with a grade or score associated with a homework, assignment, quiz, or test. For another example, the second participation metric may include or be associated with a class rank. The second participation metric may be compared with the second predetermined threshold to determine whether the second predetermined threshold is satisfied. If the second predetermined threshold is satisfied, the second participation metric is used to determine at 520 a quantity of electronic funds for distribution. On the other hand, if the second predetermined threshold is not satisfied, the second participation metric is not used to determine at 520 the quantity of electronic funds for distribution. The operations may be iteratively performed for each participation metric associated with a quality of participation.

Additionally or alternatively, one or more participation metrics indicative of a participation in the program are received at 530 from the sponsor device 140. In some embodiments, one or more participation metrics indicative of a participation in the program are received from a guardian device 150. Similar to the participation metrics received from the participant device 130, the participation metrics received from the sponsor device 140 and/or from the guardian device 150 may be associated with a quantity of participation and/or a quality of participation. A third participation metric associated with a quantity of participation is identified at 532, and it is determined at 534 whether the third participation metric satisfies a third predetermined threshold. For example, the third participation metric may include or be associated with a quantity of time (e.g., a number of hours) the sponsor device communicated or was coupled to the participant device 130. For another example, the third participation metric may include or be associated with a quantity of completed homework, assignments, quizzes, or tests. The third participation metric may be compared with the third predetermined threshold to determine whether the third predetermined threshold is satisfied. If the third predetermined threshold is satisfied, the third participation metric is used to determine at 520 a quantity of electronic funds for distribution. On the other hand, if the third predetermined threshold is not satisfied, the third participation metric is not used to determine at 520 the quantity of electronic funds for distribution. The operations may be iteratively performed for each participation metric associated with a quantity of participation.

A fourth participation metric associated with a quality of participation is identified at 542, and it is determined at 544 whether the fourth participation metric satisfies a fourth predetermined threshold. For example, the fourth participation metric may include or be associated with a grade or score associated with a homework, assignment, quiz, or test. For another example, the fourth participation metric may include or be associated with a class rank. The fourth participation metric may be compared with the fourth predetermined threshold to determine whether the fourth predetermined threshold is satisfied. If the fourth predetermined threshold is satisfied, the fourth participation metric is used to determine at 520 a quantity of electronic funds for distribution. On the other hand, if the fourth predetermined threshold is not satisfied, the fourth participation metric is not used to determine at 520 the quantity of electronic funds for distribution. The operations may be iteratively performed for each participation metric associated with a quality of participation.

Figure 6:
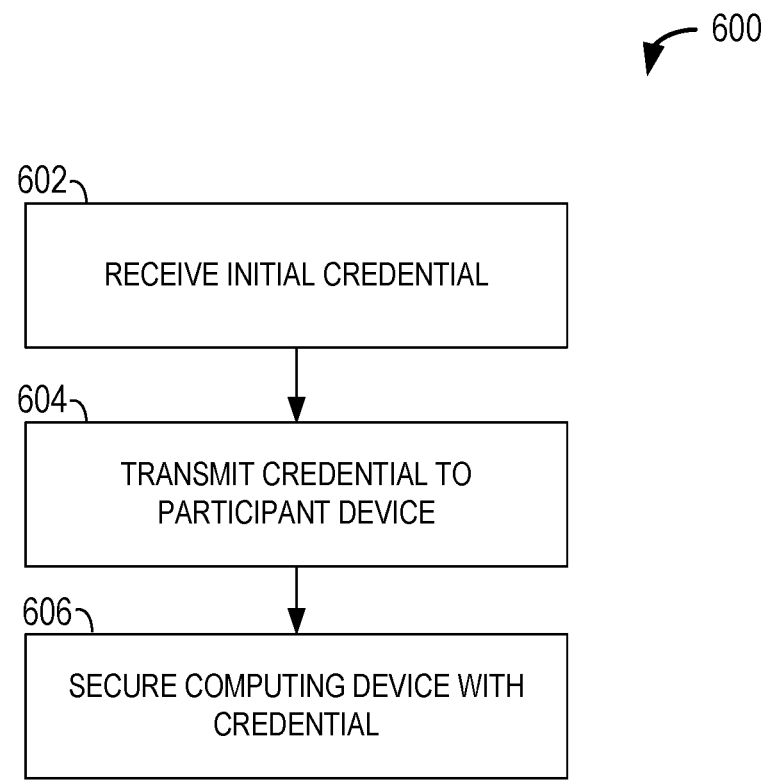
FIG. 6 is a flowchart of an example method for managing participation and tracking progress of a participant in a program.

FIG. 6 is a flowchart of an example method 600 for managing participation and tracking progress of a participant 132 in the environment 100 (shown in FIG. 1). One or more registered credentials associated with one or more users (e.g., a participant 132, a sponsor 142, and a guardian 152) of a computing device (e.g., a participant device 130, a sponsor device 140, and a guardian device 150, respectively) may be associated with a program account 170 to control or manage access to the program account 170. Registered credentials may include, for example, a username and password, and biometric data.

In some embodiments, an initial credential is received at 602 to register or associate the initial credential with the program account 170 such that the initial credential becomes a registered credential. The registered credential may be transmitted at 604 to a computing device (e.g., participant device 130, sponsor device 140, guardian device 150) and links or associates the computing device to secure at 606 the computing device with the registered credential. In this manner, the computing device is configured to receive credentials for accessing the computing device and/or the program account 170, and compare the received credential with the registered credential to determine whether to present a usable mode or configuration (e.g., an "unlocked" configuration). That is, when the received credential does not match the registered credential, the computing device may remain in a mode or configuration other than the usable mode or configuration (e.g., a "locked" configuration) such that access to the computing device and/or the program account 170 is at least partially restricted.

Figure 7:
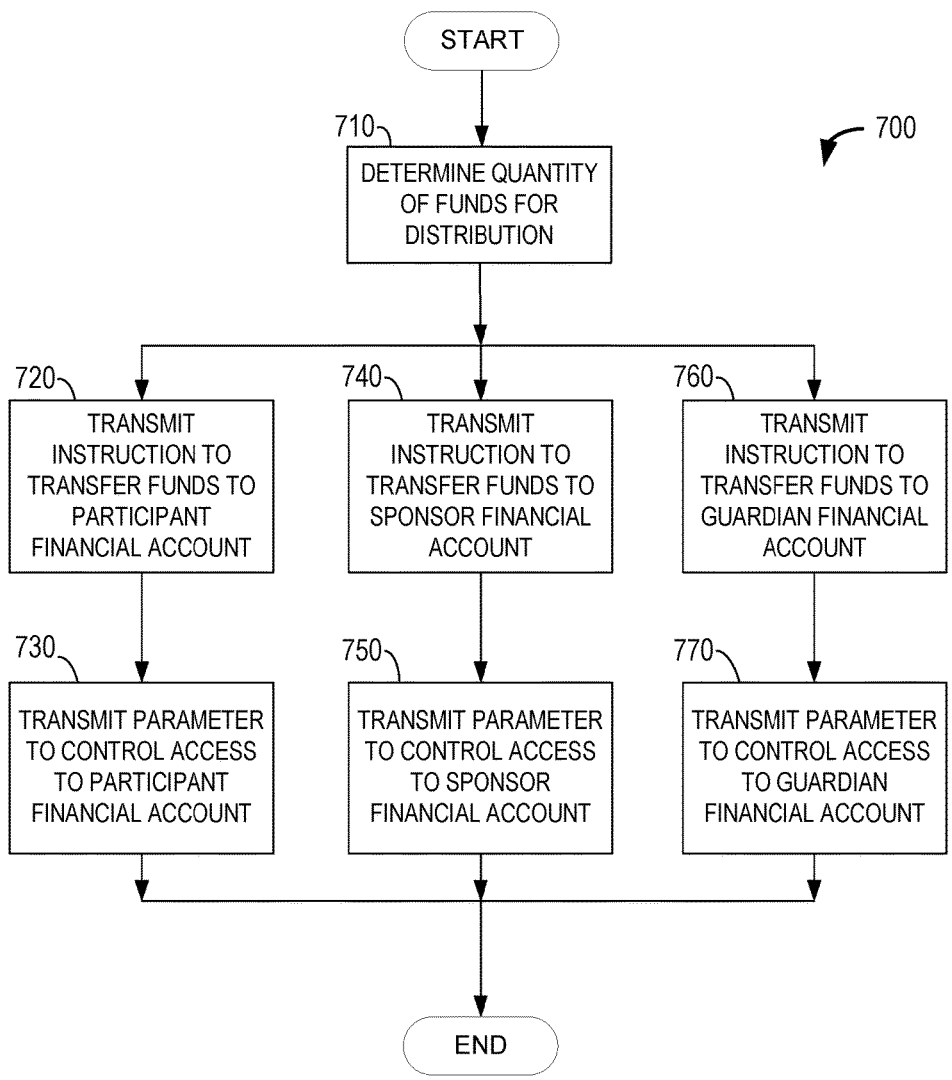
FIG. 7 is a flowchart of an example method for managing disbursement and use of funds for a program.

FIG. 7 is a flowchart of an example method 700 for managing disbursement and use of electronic funds in the environment 100 (shown in FIG. 1). In some embodiments, a quantity of electronic funds is determined 710 for distribution to the participant 132, the sponsor 142, and/or the guardian 152. The quantity of electronic funds may be determined, for example, based on one or more participation metrics.

In some embodiments, the electronic funds are transferred or credited as virtual card number (VCN) currency. VCN currency may include a 16-digit card number, an expiration date, and a security code that may be used for increased security. The VCN currency enables rule-based spending.

An instruction to transfer a first portion of the quantity of electronic funds to a participant financial account 250 is transmitted at 720. For example, the first portion may be approximately 40% of the quantity of electronic funds. In one embodiment, VCN currency is disbursed to the participant financial account 250, and one or more parameters are transmitted at 730 to control access to the VCN currency. In this manner, the electronic funds may be associated with one or more permissions and/or restrictions that control access to the electronic funds.

An instruction to transfer a second portion of the quantity of electronic funds to a sponsor financial account 260 is transmitted at 740. For example, the second portion may be approximately 10% of the quantity of electronic funds. In one embodiment, VCN currency is disbursed to the sponsor financial account 260, and one or more parameters are transmitted at 750 to control access to the VCN currency.

In some embodiments, an instruction to transfer a third portion of the quantity of electronic funds to a guardian financial account 270 is transmitted at 760. For example, the third portion may be approximately 50% of the quantity of electronic funds. In one embodiment, VCN currency is disbursed to the guardian financial account 270, and one or more parameters are transmitted at 770 to control access to the VCN currency.

Figure 8:
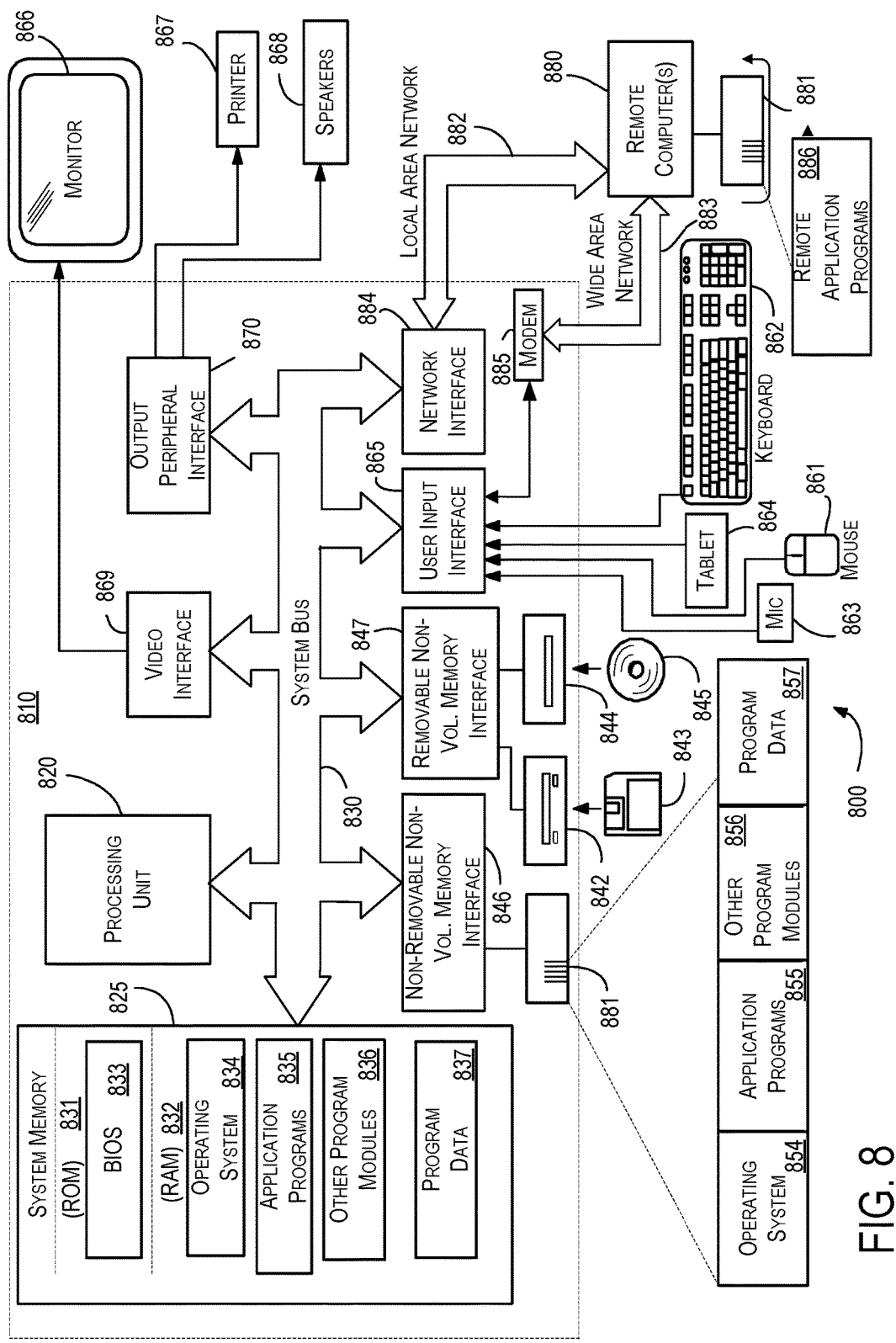
FIG. 8 is a block diagram of an example operating environment for managing distribution and use of funds for a program.

FIG. 8 is a block diagram of an example operating environment 800 that may be used to manage distribution and use of electronic funds for a program. The operating environment 800 is only one example of a computing and networking environment and is not intended to suggest any limitation as to the scope of use or functionality of the disclosure. The operating environment 800 should not be interpreted as having any dependency or requirement relating to any one or combination of components illustrated in the example operating environment 800.

The disclosure is operational with numerous other computing and networking environments or configurations. While some examples of the disclosure are illustrated and described herein with reference to the operating environment 800 being or including the system server 120 (shown in FIGS. 1 and 2), aspects of the disclosure are operable with any computing device (e.g., participant device 130, sponsor device 140, guardian device 150, data storage device 160, financial institution system 180, interface component 210, enrollment component 220, participation component 230, disbursement component 240) that executes instructions to implement the operations and functionality associated with the operating environment 800.

For example, the operating environment 800 may include a mobile device, a mobile telephone, a phablet, a tablet, a portable media player, a netbook, a laptop, a desktop computer, a personal computer, a server computer, a computing pad, a kiosk, a tabletop device, an industrial control device, a multiprocessor system, a microprocessor-based system, a set top box, programmable consumer electronics, a network computer, a minicomputer, a mainframe computer, a distributed computing environment that include any of the above systems or devices, and the like. The operating environment 800 may represent a group of processing units or other computing devices. Additionally, any computing device described herein may be configured to perform any operation described herein including one or more operations described herein as being performed by another computing device.

With reference to FIG. 8, an example system for implementing various aspects of the disclosure may include a general purpose computing device in the form of a computer 810. Components of the computer 810 may include, but are not limited to, a processing unit 820, a system memory 825, and a system bus 830 that couples various system components including the system memory 825 to the processing unit 820. The system bus 830 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The system memory 825 includes any quantity of media associated with or accessible by the processing unit 820. For example, the system memory 825 may include computer storage media in the form of volatile and/or nonvolatile memory such as read only memory (ROM) 831 and random access memory (RAM) 832. The ROM 831 may store a basic input/output system 833 (BIOS) that facilitates transferring information between elements within computer 810, such as during start-up. The RAM 832 may contain data and/or program modules that are immediately accessible to and/or presently being operated on by processing unit 820. For example, the system memory 825 may store computer-executable instructions, communication data, authentication data, application data, and other data.

The processing unit 820 may be programmed to execute the computer-executable instructions for implementing aspects of the disclosure, such as those illustrated in the figures (e.g., FIGS. 3-7). By way of example, and not limitation, FIG. 8 illustrates operating system 834, application programs 835, other program modules 836, and program data 837. The processing unit 820 includes any quantity of processing units, and the instructions may be performed by the processing unit 820 or by multiple processors within the operating environment 800 or performed by a processor external to the operating environment 800.

The system memory 825 may include computer-executable instructions, participant 132 account information (e.g., parameters, preferences, rules, thresholds), message data, security data, enrollment data, and other data. For example, the system memory 825 may include an interface component 210 (shown in FIG. 2), an enrollment component 220 (shown in FIG. 2), a participation component 230 (shown in FIG. 2), and/or a disbursement component 240 (shown in FIG. 2) for implementing aspects of the disclosure. Upon programming or execution of these components, the operating environment 800 and/or processing unit 820 is transformed into a special purpose microprocessor or machine. For example, the interface component 210, when executed by the processing unit 820, causes the processing unit 820 to receiving a request to enroll a participant in a program, receive one or more participation metrics corresponding to a participation of the participant in the program, transmit an instruction to transfer a portion of a determined quantity of electronic funds to a financial account associated with a party associated with the portion; and transmit one or more parameters configured to control access to the electronic funds; the enrollment component 220, when executed by the processing unit 820, causes the processing unit 820 to determine an eligibility of a participant, and enroll the participant in a program; the participation component 230, when executed by the processing unit 820, causes the processing unit 820 to generate one or more participation metrics; and the disbursement component 240, when executed by the processing unit 820, causes the processing unit 820 to determine a quantity of electronic funds for distribution to a plurality of parties, generate an instruction to transfer a portion of the determined quantity of the electronic funds to a financial account associated with a party associated with the portion; and generate one or more parameters configured to control access to the electronic funds. Although the processing unit 820 is shown separate from the system memory 825, embodiments of the disclosure contemplate that the system memory 825 may be onboard the processing unit 820 such as in some embedded systems.

The computer 810 may also include other removable/non-removable, volatile/nonvolatile computer storage media. By way of example only, FIG. 8 illustrates a hard disk drive 841 that reads from or writes to non-removable, nonvolatile magnetic media, a magnetic disk drive 842 that reads from or writes to a removable, nonvolatile magnetic disk 843 (e.g., a floppy disk, a tape cassette), and an optical disk drive 844 that reads from or writes to a removable, nonvolatile optical disk 845 (e.g., a compact disc (CD), a digital versatile disc (DVD)). Other removable/non-removable, volatile/nonvolatile computer storage media that may be used in the example operating environment include, but are not limited to, flash memory cards, digital video tape, solid state RAM, solid state ROM, and the like. The hard disk drive 841 may be connected to the system bus 830 through a non-removable memory interface such as interface 846, and magnetic disk drive 842 and optical disk drive 844 may be connected to the system bus 830 by a removable memory interface, such as interface 847.

The drives and their associated computer storage media, described above and illustrated in FIG. 8, provide storage of computer-readable instructions, data structures, program modules and other data for the computer 810. In FIG. 8, for example, hard disk drive 841 is illustrated as storing operating system 854, application programs 855, other program modules 856 and program data 857. Note that these components may either be the same as or different from operating system 834, application programs 835, other program modules 836, and program data 837. Operating system 854, application programs 855, other program modules 856, and program data 857 are given different numbers herein to illustrate that, at a minimum, they are different copies.

The computer 810 includes a variety of computer-readable media. Computer-readable media may be any available media that may be accessed by the computer 810 and includes both volatile and nonvolatile media, and removable and non-removable media. By way of example, and not limitation, computer-readable media may comprise computer storage media and communication media. Computer storage media includes volatile and nonvolatile, removable and non-removable media implemented in any method or technology for storage of information such as computer-readable instructions, data structures, program modules or other data. ROM 831 and RAM 832 are examples of computer storage media. Computer storage media are tangible and mutually exclusive to communication media. Computer storage media for purposes of this disclosure are not signals per se. Example computer storage media includes, but is not limited to, hard disks, flash drives, solid state memory, RAM, ROM, electrically erasable programmable read-only memory (EEPROM), flash memory or other memory technology, CDs, DVDs, or other optical disk storage, magnetic cassettes, magnetic tape, magnetic disk storage or other magnetic storage devices, or any other medium which may be used to store the desired information and which may accessed by the computer 810. Computer storage media are implemented in hardware and exclude carrier waves and propagated signals. Any such computer storage media may be part of computer 810.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media.

A user may enter commands and information into the computer 810 through one or more input devices, such as a pointing device 861 (e.g., mouse, trackball, touch pad), a keyboard 862, a microphone 863, and/or an electronic digitizer 864 (e.g., tablet). Other input devices not shown in FIG. 8 may include a joystick, a game pad, a controller, a satellite dish, a camera, a scanner, an accelerometer, or the like. These and other input devices may be coupled to the processing unit 820 through a user input interface 865 that is coupled to the system bus 830, but may be connected by other interface and bus structures, such as a parallel port, game port or a universal serial bus (USB).

Information, such as text, images, audio, video, graphics, alerts, and the like, may be presented to a user via one or more presentation devices, such as a monitor 866, a printer 867, and/or a speaker 868. Other presentation devices not shown in FIG. 8 may include a projector, a vibrating component, or the like. These and other presentation devices may be coupled to the processing unit 820 through a video interface 869 (e.g., for a monitor 866 or a projector) and/or an output peripheral interface 870 (e.g., for a printer 867, a speaker 868, and/or a vibration component) that are coupled to the system bus 830, but may be connected by other interface and bus structures, such as a parallel port, game port or a USB. In some embodiments, the presentation device is integrated with an input device configured to receive information from the user (e.g., a capacitive touch-screen panel, a controller including a vibrating component). Note that the monitor 866 and/or touch screen panel may be physically coupled to a housing in which the computer 810 is incorporated, such as in a tablet-type personal computer.

The computer 810 may operate in a networked environment using logical connections to one or more remote computers, such as a remote computer 880. The remote computer 880 may be a personal computer, a server, a router, a network PC, a peer device or other common network node, and typically includes many or all of the elements described above relative to the computer 810, although only a memory storage device 881 has been illustrated in FIG. 8. The logical connections depicted in FIG. 8 include one or more local area networks (LAN) 882 and one or more wide area networks (WAN) 883, but may also include other networks. Such networking environments are commonplace in offices, enterprise-wide computer networks, intranets and the Internet.

When used in a LAN networking environment, the computer 810 is coupled to the LAN 882 through a network interface or adapter 884. When used in a WAN networking environment, the computer 810 may include a modem 885 or other means for establishing communications over the WAN 883, such as the Internet. The modem 885, which may be internal or external, may be connected to the system bus 830 via the user input interface 865 or other appropriate mechanism. A wireless networking component such as comprising an interface and antenna may be coupled through a device such as an access point or peer computer to a LAN 882 or WAN 883. In a networked environment, program modules depicted relative to the computer 810, or portions thereof, may be stored in the remote memory storage device. By way of example, and not limitation, FIG. 8 illustrates remote application programs 886 as residing on memory storage device 881. It may be appreciated that the network connections shown are examples and other means of establishing a communications link between the computers may be used.

The block diagram of FIG. 8 is merely illustrative of an example system that may be used in connection with one or more examples of the disclosure and is not intended to be limiting in any way. Further, peripherals or components of the computing devices known in the art are not shown, but are operable with aspects of the disclosure. At least a portion of the functionality of the various elements in FIG. 8 may be performed by other elements in FIG. 8, or an entity (e.g., processor, web service, server, applications, computing device, etc.) not shown in FIG. 8.

Figure 9:
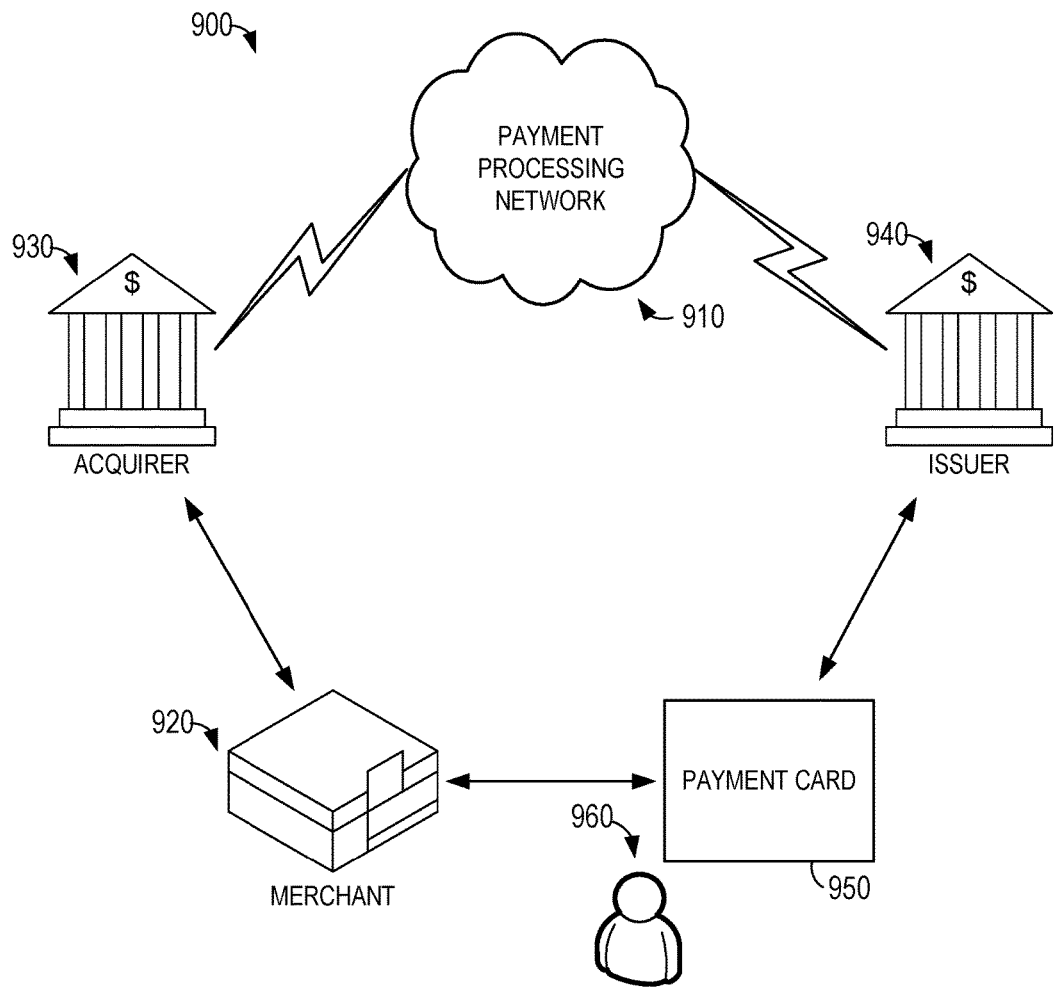
FIG. 9 is a block diagram illustrating an example environment for managing use of funds for a program.

FIG. 9 is a block diagram illustrating an example system or environment 900 for managing distribution and use of electronic funds for a program. The electronic funds disbursed to the participant 132, the sponsor 142, and/or the guardian 152 may be used in the environment 900. The environment 900 includes a processing network 910, such as the MASTERCARD® brand payment processing network (MASTERCARD® is a registered trademark of MasterCard International Incorporated located in Purchase, N.Y.). The MASTERCARD® brand payment processing network is a propriety network for exchanging financial transaction data between members of the MASTERCARD® brand payment processing network.

The environment 900 includes one or more merchants 920 that accept payment via the processing network 910. To accept payment via the processing network 910, the merchant 920 establishes a financial account with an acquirer 930 that is a member of the processing network 910. The acquirer 930 is a financial institution that maintains a relationship with one or more merchants 920 to enable the merchants 920 to accept payment via the processing network 910. The acquirer 930 may also be known as an acquiring bank, a processing bank, or a merchant bank.

The environment 900 includes one or more issuers 940 that issue or provide payment cards 950 (e.g., credit card, debit card, prepaid card, and the like) or other payment products to one or more cardholders 960 or, more broadly, account holders ("cardholder" and "account holder" may be used interchangeably herein). The issuer 940 is a financial institution that maintains a relationship with one or more cardholders 960 to enable the cardholders 960 to make a payment using the payment card 950 via the processing network 910.

A cardholder 960 uses a payment product, such as a payment card 950, to purchase a good or service from a merchant 920. In some embodiments, the payment card 950 is linked or associated with electronic wallet technology or contactless payment technology, such as a radio frequency identification (RFID)-enabled device, a BLUETOOTH® brand wireless technology-enabled device, a ZIGBEE® brand communication-enabled device, a WI-FI® brand local area wireless computing network-enabled device, a near field communication (NFC) wireless communication-enabled device, and/or any other device that enables the payment card 950 to purchase a good or service from a merchant 920. (BLUETOOTH® is a registered trademark of Bluetooth Special Interest Group, ZIGBEE® is a registered trademark of the ZigBee Alliance, and WI-FI® is a registered trademark of the Wi-Fi Alliance). The cardholder 960 may use any payment product that is linked or associated with a corresponding financial account maintained by an issuer 940. As described herein, the term "payment card" includes credit cards, debit cards, prepaid cards, digital cards, smart cards, and any other payment product that is linked or associated with a corresponding financial account maintained by an issuer 940. Payment cards 950 may have any shape, size, or configuration that enables the environment 900 to function as described herein.

A cardholder 960 may present the merchant 920 with a payment card 950 to make a payment to the merchant 920 in exchange for a good or service. Alternatively, the cardholder 960 may provide the merchant 920 with account information associated with the payment card 950 without physically presenting the payment card 950 (e.g., for remote financial transactions, including e-commerce transactions, card-not-present transactions, or card-on-file transactions). Account information may include a name of the cardholder 960, an account number, an expiration date, a security code (such as a card verification value (CVV), a card verification code (CVC), and the like), and/or a personal identification number (PIN).

The merchant 920 requests authorization from an acquirer 930 for at least the amount of the purchase. The merchant 920 may request authorization using any financial transaction computing device configured to transmit account information of the cardholder 960 to one or more financial transaction processing computing devices of the acquirer 930. For example, the merchant 920 may request authorization through a point-of-sale (POS) terminal, which reads account information of the cardholder 960 from a microchip or magnetic stripe on the payment card 950, and transmits the cardholder's account information to the one or more financial transaction processing computing devices of the acquirer 930. For another example, the POS terminal reads account information of the cardholder 960 from a device configured to communicate with the POS terminal using contactless payment technology, and transmits the cardholder's account information to one or more financial transaction processing computing devices of the acquirer 930.

Using the processing network 910, the financial transaction processing computing devices of the acquirer 930 communicate with one or more financial transaction processing computing devices of an issuer 940 to determine whether the account information of the cardholder 960 matches or corresponds with the account information of the issuer 940, whether the account is in good standing, and/or whether the purchase is covered by (e.g., less than) a credit line or account balance associated with the financial account. Based on these determinations, the financial transaction processing computing devices of the issuer 940 determine whether to approve or decline the request for authorization from the merchant 920.

If the request for authorization is declined, the merchant 920 is notified as such, and may request authorization from the acquirer 930 for a lesser amount or request an alternative form of payment from the cardholder 960. If the request for authorization is approved, an authorization code is issued to the merchant 920, and the cardholder's available credit line or account balance is decreased. The financial transaction is then settled between the merchant 920, the acquirer 930, the issuer 940, and/or the cardholder 960. Settlement typically includes the acquirer 930 reimbursing the merchant 920 for selling the good or service, and the issuer 940 reimbursing the acquirer 930 for reimbursing the merchant 920. When a credit card is used, the issuer 940 may bill the cardholder 960 to settle a financial account associated with the cardholder 960. When a debit or prepaid card is used, the issuer 940 may automatically withdraw funds from the account.

Although described in connection with an example computing system environment, embodiments of the disclosure are capable of implementation with numerous other general purpose or special purpose computing system environments, configurations, or devices.

Embodiments of well-known computing systems, environments, and/or configurations that may be for use with aspects of the disclosure include, but are not limited to, mobile computing devices, personal computers, server computers, hand-held or laptop devices, multiprocessor systems, gaming consoles, microprocessor-based systems, set top boxes, programmable consumer electronics, mobile telephones, mobile computing and/or communication devices in wearable or accessory form factors (e.g., watches, glasses, headsets, earphones, and the like), network PCs, minicomputers, mainframe computers, distributed computing environments that include any of the above systems or devices, and the like. Such systems or devices may accept input from the cardholder in any way, including from input devices such as a keyboard or pointing device, via gesture input, proximity input (such as by hovering), and/or via voice input.

Embodiments of the disclosure may be described in the general context of computer-executable instructions, such as program modules, executed by one or more computers or other devices in software, firmware, hardware, or a combination thereof. The computer-executable instructions may be organized into one or more computer-executable components or modules. Generally, program modules include, but are not limited to, routines, programs, objects, components, and data structures that perform particular tasks or implement particular abstract data types. Aspects of the disclosure may be implemented with any number and organization of such components or modules. For example, aspects of the disclosure are not limited to the specific computer-executable instructions or the specific components or modules illustrated in the figures and described herein. Other embodiments of the disclosure may include different computer-executable instructions or components having more or less functionality than illustrated and described herein.

The embodiments illustrated and described herein as well as embodiments not specifically described herein but within the scope of aspects of the disclosure constitute example means for the distribution and use of electronic funds associated with a program, and incentivizing the participation in the program. For example, the elements illustrated in FIG. 1, 2, 8, or 9 such as when encoded to perform the operations illustrated in FIGS. 3-7 constitute at least an example means for receiving one or more metrics corresponding to a participation of a participant in the program (e.g., interface component 210); an example means for comparing one or more metrics with one or more predetermined thresholds to determine whether the metrics satisfy predetermined thresholds (e.g., disbursement component 240); an example means for determining a quantity of electronic funds for distribution to a plurality of parties (e.g., disbursement component 240); an example means for determining a portion of electronic funds for distribution to a party (e.g., disbursement component 240); an example means for generating an instruction to transfer a portion of electronic funds to a financial account associated with a party (e.g., disbursement component 240); and/or an example means for transmitting an instruction to transfer a portion of electronic funds to a financial account associated with a party (e.g., disbursement component 240).

The order of execution or performance of the operations in embodiments of the disclosure illustrated and described herein is not essential, unless otherwise specified. That is, the operations may be performed in any order, unless otherwise specified, and embodiments of the disclosure may include additional or fewer operations than those disclosed herein. For example, it is contemplated that executing or performing a particular operation before, contemporaneously with, or after another operation is within the scope of aspects of the disclosure.

When introducing elements of aspects of the disclosure or the embodiments thereof, the articles "a," "an," "the," and "said" are intended to mean that there are one or more of the elements. Furthermore, references to an "embodiment" or "example" of the present disclosure are not intended to be interpreted as excluding the existence of additional embodiments or examples that also incorporate the recited features. The terms "comprising," "including," and "having" are intended to be inclusive and mean that there may be additional elements other than the listed elements. The phrase "one or more of the following: A, B, and C" means "at least one of A and/or at least one of B and/or at least one of C."

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

In some embodiments, the operations illustrated in the drawings may be implemented as software instructions encoded on a computer readable medium, in hardware programmed or designed to perform the operations, or both. For example, aspects of the disclosure may be implemented as a system on a chip or other circuitry including a plurality of interconnected, electrically conductive elements.

While the aspects of the disclosure have been described in terms of various embodiments with their associated operations, a person skilled in the art would appreciate that a combination of operations from any number of different embodiments is also within scope of the aspects of the disclosure.

What is claimed is:

1. A computer-implemented method for managing funds for a program that includes a plurality of parties participating in the program including a participant, a guardian associated with the participant and a sponsor, the computer-implemented method comprising:
    associating a participant device associated with the participant, a sponsor device associated with the sponsor, and a guardian device associated with the guardian to one or more program accounts;
    receiving, from the participant device a first set of metrics corresponding to a participation of the participant in the program;
    receiving, from the guardian device, a second set of metrics corresponding to the participation of the participant in the program, the second set including a measure of quantity of the participation, and a measure of quality of the participation;
    on condition that the received first set of metrics and the second set of metrics satisfy one or more thresholds, determining a quantity of the funds for distribution to the plurality of parties;
    generating a first instruction to transfer a first portion of the determined quantity of the funds to a first financial account of the one or more program accounts, the first financial account being associated with the participant;
    generating a second instruction to transfer a second portion of the determined quantity of the funds to a second financial account of the one or more program accounts, the second financial account being associated with the sponsor; and
    generating a third instruction to transfer a third portion of the determined quantity of the funds to a third financial account of the one or more program accounts, the third financial account being associated with the guardian.

2. The computer-implemented method of claim 1, wherein the measure of quantity of the participation comprises one or more of the following: a number of hours logged on the participant device and a number of hours spent on an education module.

3. The computer-implemented method of claim 1, wherein the first set of metrics comprises one or more of the following: attendance records, homework progress, assignment progress, quiz scores, test scores, and class rank.

4. The computer-implemented method of claim 1, further comprising:
    prompting the participant device to provide data for enrollment of the participant in the program; and
    prompting the sponsor device to provide data for enrollment of the sponsor in the program.

5. The computer-implemented method of claim 1, further comprising:
    monitoring a progress of participation in the program by the participant and
    transferring the first portion of the determined quantity of the funds based on the first instruction and disbursing at least a part of the first portion of the quantity of the funds to the participant based on continued monitoring of the progress made by the participant in the participation.

6. The computer-implemented method of claim 1, further comprising:
    generating one or more parameters configured to control access to the third portion; and
    transmitting, to a financial institution system associated with the third financial account, the one or more parameters.

7. The computer-implemented method of claim 5, wherein the continued monitoring of the progress is based on an education module provided to the participant by the sponsor, the education module associated with one or more of the following: homework, assignments, quizzes, and tests.

8. The computer-implemented method of claim 5, wherein the disbursed at least a part of the first portion of the quantity of the funds is permitted to be spent on categories including goods, services, or both.

9. A computing device for managing funds for a program, the computing device comprising:
a memory device storing data associated with a plurality of parties participating in the program including a participant, a guardian associated with the participant and a sponsor, and computer-executable instructions; and
a processor configured to execute the computer-executable instructions to:
associate a participant device associated with the participant, a sponsor device associated with the sponsor, and a guardian device associated with the guardian to one or more program accounts;
receive from the participant device a first set of metrics corresponding to a participation of the participant in the program;
receive, from the guardian device, a second set of metrics corresponding to the participation of the participant in the program, the second set including a measure of quantity of the participation, and a measure of quality of the participation;
on condition that the received first set of metrics and the second set of metrics satisfy one or more thresholds, determine a quantity of the funds for distribution to the plurality of parties;
transmit a first instruction to transfer a first portion of the determined quantity of funds to a first financial account associated with the one or more program accounts, the first financial account being associated with the participant;
transmit a second instruction to transfer a second portion of the determined quantity of funds to a second financial account of the one or more program accounts, the second financial account being associated with the sponsor; and
generate a third instruction to transfer a third portion of the determined quantity of the funds to a third financial account of the one or more program accounts, the third financial account being associated with the guardian.

10. The computing device of claim 9, wherein receiving the first set of metrics comprises receiving, from the sponsor device, a sponsor metric generated at the sponsor device, the sponsor metric corresponding to one or more of a quantity of participation of the participant in the program and a quality of participation of the participant in the program.

11. The computing device of claim 9, wherein the processor is further configured to execute the computer-executable instructions to:
monitor a progress of participation in the program by the participant and
transfer the first portion of the determined quantity of the funds based on the first instruction and disbursing at least a part of the first portion of the quantity of the funds to the participant based on continued monitoring of the progress made by the participant in the participation.

12. The computing device of claim 9, wherein the processor is further configured to execute the computer-executable instructions to:
generate one or more parameters configured to control access to the first portion of the funds; and
transmit, to a system associated with the first financial account, the one or more parameters.

13. The computing device of claim 11, wherein the continued monitoring of the progress is based on an education module provided to the participant by the sponsor, the education module associated with one or more of the following: homework, assignments, quizzes, and tests.

14. The computing device of claim 9, wherein the processor is further configured to execute the computer-executable instructions to:
generate one or more parameters configured to control access to the third portion of the funds; and
transmit, to a system associated with the third financial account, the one or more parameters.

15. The computing device of claim 9, wherein the processor is further configured to execute the computer-executable instructions to:
receive, from the sponsor device, a request to enroll the participant in the program;
upon receiving the request, transmit, to the participant device, a prompt to provide data for participant enrollment;
receive, from the participant device, user input for the participant enrollment;
upon receiving the user input, communicate with a system to determine an eligibility of the participant based on the received user input; and
on condition that the participant is eligible to participate in the program, enroll the participant in the program.

16. The computing device of claim 9, wherein the processor is further configured to execute the computer-executable instructions to:
transmit, to the participant device, a prompt to provide data for financial account registration, receive, from the participant device, user input for financial account registration, and upon receiving the user input, communicate with a system to associate the first financial account with the participant.

17. A computer-readable storage device having computer-executable instructions embodied thereon, wherein, upon execution by at least one processor, the computer-executable instructions cause the processor to:
associate a participant device associated with the participant, a sponsor device associated with a sponsor, and a guardian device associated with a guardian associated with the participant, to one or more program accounts, the participant, the sponsor and guardian being from a plurality of parties participating in a program for managing funds to be distributed among the plurality of parties;
receive, from the participant device a first set of metrics corresponding to a participation of the participant in the program; and receive, from the guardian device, a second set of metrics corresponding to the participation of the participant in the program, the second set including a measure of quantity of the participation, and a measure of quality of the participation in the program;
on condition that the received first set of metrics and the second set of metrics satisfy one or more thresholds, determine a quantity of of funds for distribution to the plurality of parties;
generate a first instruction to transfer a first portion of the determined quantity of funds to a first financial account associated with the participant;
generate a second instruction to transfer a second portion of the determined quantity of funds to a second financial account associated with the sponsor; and
generate a third instruction to transfer a third portion of the determined quantity of funds to a third financial account associated with the guardian.

18. The computer-readable storage device of claim 17, wherein, upon execution by the at least one processor, the computer-executable instructions further cause the processor to:

generate one or more parameters configured to control access to the first portion of the funds; and transmit, to a system associated with the first financial account, the one or more parameters.

19. The computer-readable storage device of claim 17, wherein, upon execution by the at least one processor, the computer-executable instructions further cause the processor to:

monitor a progress of participation in the program by the participant and transfer the first portion of the determined quantity of the funds based on the first instruction and disbursing at least a part of the first portion of the quantity of the funds to the participant based on continued monitoring of the progress made by the participant in the participation.

20. The computer-readable storage device of claim 17, wherein the continued monitoring of the progress is based on an education module provided to the participant by the sponsor, the education module associated with one or more of the following: homework, assignments, quizzes, and tests.

* * * * *